(12) United States Patent
Beyer et al.

(10) Patent No.: US 6,422,265 B1
(45) Date of Patent: Jul. 23, 2002

(54) VALVE SEAT FOR FUEL PRESSURE REGULATOR

(75) Inventors: Sharon Elizabeth Beyer, Grand Blanc; Mohammed Aslam, Flint; Chris Clarence Begley, Ortonville, all of MI (US); Grover Wesley Preston, Livonia, NY (US); Daniel J. Buehler, Owosso, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/738,853

(22) Filed: Dec. 15, 2000

(51) Int. Cl.[7] .............................................. F16K 31/126
(52) U.S. Cl. ........................ 137/510; 251/118; 123/463
(58) Field of Search ................................ 137/509, 510; 123/463; 251/118

(56) References Cited

U.S. PATENT DOCUMENTS

| | | | |
|---|---|---|---|
| 1,342,667 A | * 6/1920 | Dougherty et al. | 137/510 X |
| 3,968,896 A | 7/1976 | Giacoletti et al. | |
| 4,237,924 A | * 12/1980 | Benjamin et al. | 137/510 |
| 4,625,695 A | * 12/1986 | Tuckey | 123/463 |
| 4,852,761 A | 8/1989 | Turner et al. | |
| 4,936,342 A | * 6/1990 | Kojima et al. | 137/510 |
| 5,076,320 A | * 12/1991 | Robinson | 123/463 X |
| 5,218,942 A | 6/1993 | Coha et al. | |
| 5,394,900 A | * 3/1995 | Okuyama et al. | 137/510 |
| 5,429,094 A | * 7/1995 | Akiba et al. | 123/463 |
| 5,660,206 A | 8/1997 | Neal et al. | |
| 5,720,263 A | * 2/1998 | Frank et al. | 137/510 X |
| 5,794,597 A | * 8/1998 | Schwegler et al. | 123/463 X |

* cited by examiner

Primary Examiner—John Rivell
(74) Attorney, Agent, or Firm—Vincent A. Cichosz

(57) ABSTRACT

A valve seat for a fuel pressure regulator includes a valve body adapted to be disposed in the fuel pressure regulator and a passageway extending axially through the valve body. The passageway is tapered through the valve body to reduce fluid flow cavitation by limiting expansion of the fuel.

20 Claims, 2 Drawing Sheets

VALVE SEAT FOR FUEL PRESSURE REGULATOR

TECHNICAL FIELD

The present invention relates generally to fuel pressure regulators for vehicles and, more particularly, to a valve seat for a fuel pressure regulator of a vehicle.

BACKGROUND OF THE INVENTION

It is known to provide a fuel tank in a vehicle to hold fuel to be used by an engine of the vehicle. It is also known to provide a fuel pump inside the fuel tank to pump fuel to the engine and a fuel pressure regulator fluidly connected to the fuel pump to regulate the pressure of the fuel to the engine. In a "mechanical demand" fuel system, the fuel pressure regulator is located in the fuel tank and is part of a fuel pump module. Typically, the fuel pressure regulator includes a valve seat and a valve cooperating with the valve seat to allow fuel to exit the fuel pressure regulator. Recently, it was discovered that fluid flow cavitation in the regulator valve seat creates a fluid noise. This fluid noise, caused by the bypass of engine return fuel through the fuel pressure regulator, had previously been unnoticeable because it was masked by the engine. With the pressure regulator located in the fuel tank, this fluid noise may be audible dependent on fuel system architecture and is therefore a potential source of objectionable noise.

One attempt to overcome or lower the objectionable noise is to use a damper after the fuel pressure regulator to mask the fluid noise. However, the damper adds more weight and cost to the vehicle, both of which are undesired.

Therefore, it is desirable to provide a low noise valve seat in a fuel pressure regulator for a fuel tank in a vehicle. It is also desirable to provide a valve seat for a fuel pressure regulator that reduces fluid flow cavitation. It is further desirable to provide a valve seat for a fuel pressure regulator that reduces audible noise at a relatively low cost.

SUMMARY OF THE INVENTION

It is, therefore, one object of the present invention to provide a valve seat for a fuel pressure regulator of a vehicle.

It is another object of the present invention to provide a valve seat for a fuel pressure regulator that has relatively low noise, low cost, and low fluid flow cavitation.

To achieve the foregoing objects, the present invention is a valve seat for a fuel pressure regulator including a valve body adapted to be disposed in the fuel pressure regulator and a passageway extending axially through the valve body. The passageway is tapered through the valve body to reduce fluid flow cavitation by limiting expansion of the fuel.

One advantage of the present invention is that a new valve seat is provided for a fuel pressure regulator located in a fuel tank of a vehicle. Another advantage of the present invention is that the valve seat reduces fluid flow cavitation, thereby reducing the audible noise level to provide low noise operation. Yet another advantage of the present invention is that the valve seat improves performance of the fuel pressure regulator with respect to the audible noise level. Still another advantage of the present invention is that the valve seat does not add additional parts or cost to meet low noise operation.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
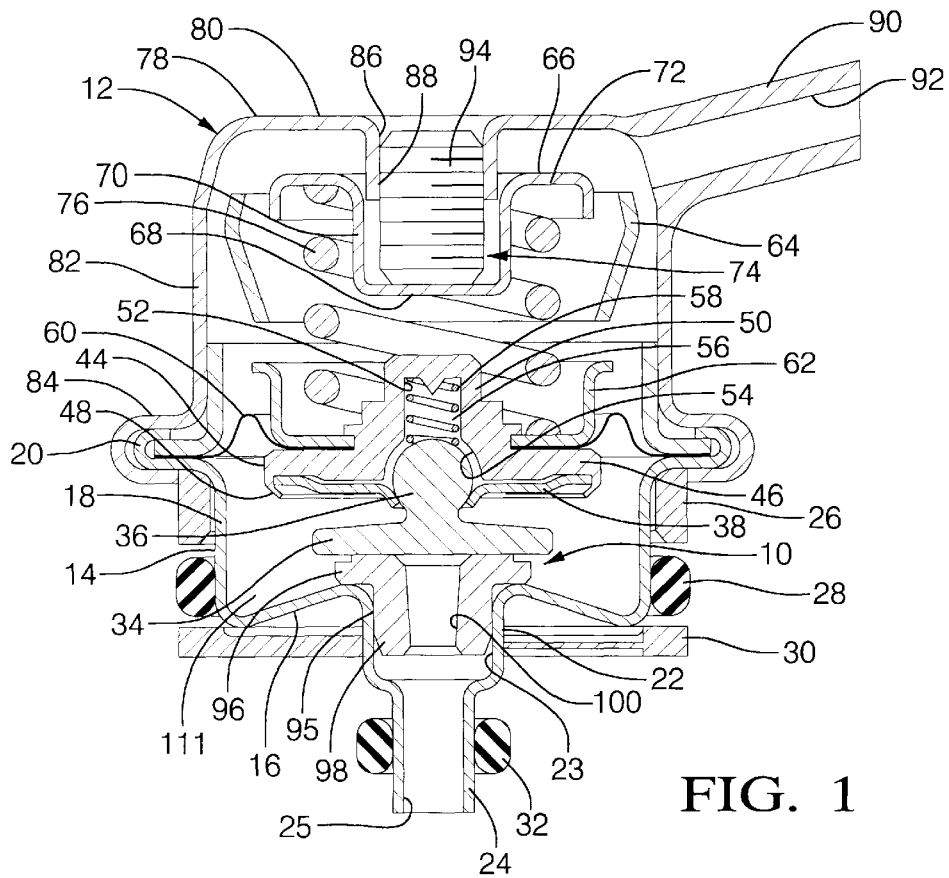
FIG. 1 is a fragmentary elevational view of a valve seat, according to the present invention, illustrated in operational relationship with a fuel pressure regulator.
Figure 2:
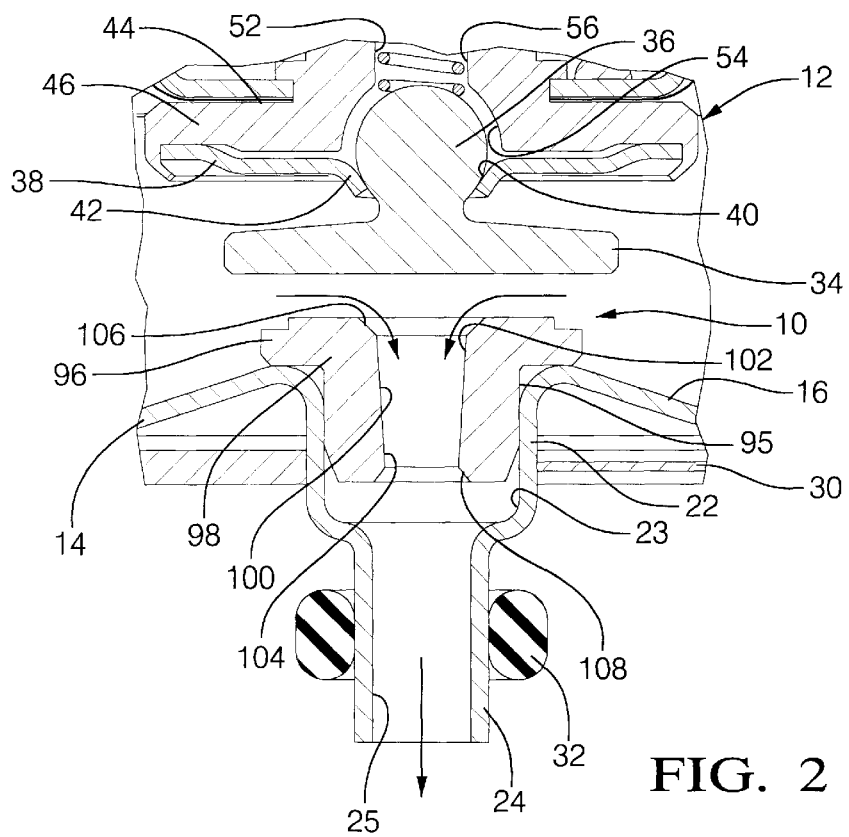
FIG. 2 is an enlarged fragmentary elevational view of the valve seat and fuel pressure regulator of FIG. 1 illustrating an open position.

Referring to the drawings and in particular FIGS. 1 and 2, one embodiment of a valve seat 10, according to the present invention, is shown for a fuel pressure regulator, generally indicated at 12, located in a fuel tank (not shown) of a vehicle (not shown). The fuel pressure regulator 12 includes a base 14. The base 14 is generally circular in shape. The base 14 has a base wall 16 extending radially and axially at an angle and a side wall 18 extending axially and circumferentially from the base wall 16. The base 14 also includes a flange wall 20 extending radially and circumferentially from the side wall 18 and having a generally "C" cross-sectional shape. The base 14 has a seat wall 22 extending axially from the base wall 16. The seat wall 22 is generally tubular with a circular cross-sectional shape to form a cavity 23. The valve seat 10 is disposed partially in the cavity 23 of the seat wall 22 for a function to be described.

The base 14 also has a reduced diameter connector wall 24 extending axially from the seat wall 22. The connector wall 24 is generally tubular with a circular cross-sectional shape to form a passageway 25 extending axially therethrough and communicating with the cavity 23. The connector wall 24 is for attachment to a conduit (not shown), which in turn, is connected to an outlet (not shown) of a fuel pump module (not shown). The base 14 is made of a rigid material such as metal. It should be appreciated that the base 14 is a monolithic structure being integral, unitary, and one-piece. It should also be appreciated that the base 14 is conventional and known in the art.

Figure 3:
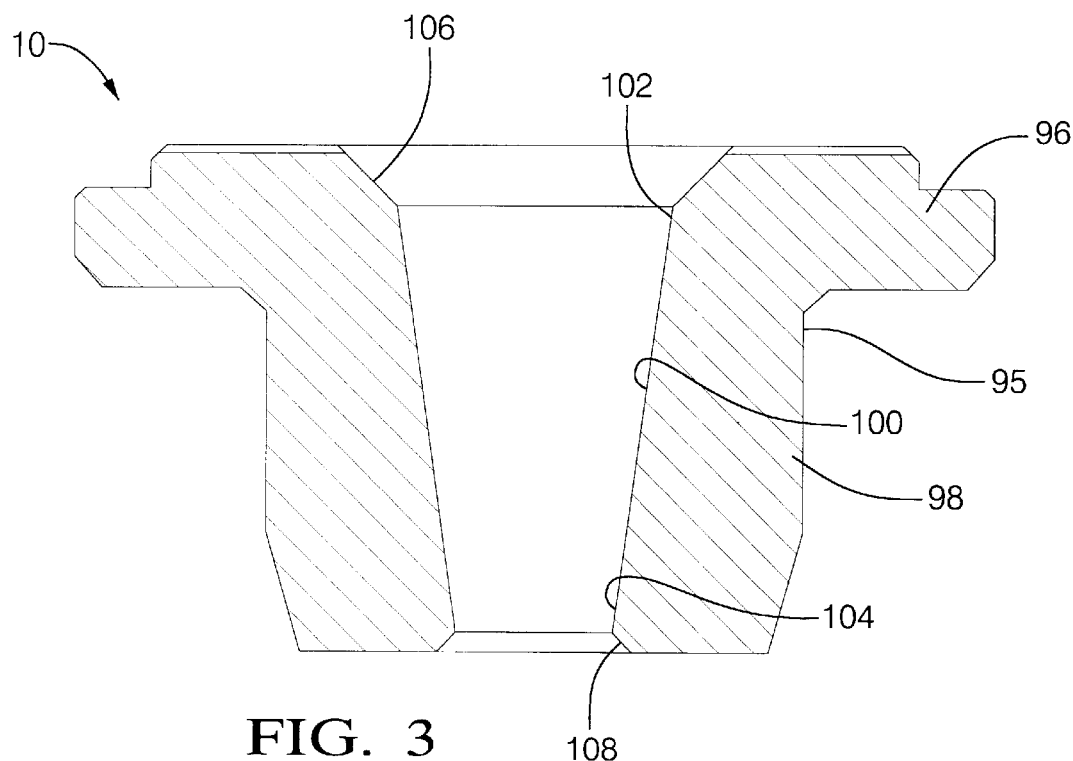
FIG. 3 is a fragmentary elevational view of the valve seat of FIGS. 2 and 3.

Referring to FIGS. 1 through 3, the fuel pressure regulator 12 also includes a ring back-up 26 disposed about the side wall 18 of the base 14. The ring back-up 26 is a ring extending axially and having a generally circular cross-sectional shape. The fuel pressure regulator 12 also includes a regulator O-ring 28 disposed about the side wall 18 of the base 14 and adjacent to the ring back-up 26. The regulator O-ring 28 is generally circular in shape and is made of an elastomeric material. The fuel pressure regulator 12 includes a fuel filter 30 disposed about the seat wall 22 and adjacent to the regulator O-ring 28. The fuel filter 30 is generally circular in shape. The fuel pressure regulator 12 also includes an outlet O-ring 32 disposed about the connector wall 24. The outlet O-ring 32 is generally circular in shape and is made of an elastomeric material. It should be appreciated that the ring back-up 26, regulator O-ring 28, fuel filter 30, and outlet O-ring 32 are conventional and known in the art.

The fuel pressure regulator 12 includes a valve 34 cooperating with the valve seat 10. The valve 34 extends radially and is generally circular in shape. The valve 34 is generally planar and has a projection 36 extending axially away from the valve seat 10. The projection 36 is generally spherically shaped for a function to be described. The valve 34 is made of a rigid material such as metal, preferably steel. It should be appreciated that the valve 34 is conventional and known in the art.

The fuel pressure regulator 12 includes a valve retainer 38 disposed about the projection 26 of the valve 34. The valve retainer 38 extends radially and is generally circular in shape. The valve retainer 38 has an aperture 40 extending axially therethrough to receive the projection 36 and a flange 42 about the aperture 40 extending axially and radially inward to retain the projection 36. The valve retainer 38 is made of a rigid material such as metal. It should be appreciated that the valve retainer 38 is conventional and known in the art.

The fuel pressure regulator 12 includes a diaphragm retainer plate 44 disposed about the valve retainer 38. The diaphragm retainer plate 44 has a base portion 46 extending radially and generally circular in shape. The diaphragm retainer plate 44 includes a flange portion 48 extending axially and radially inward from the base portion 46 to retain the diaphragm retainer plate 44 to the valve retainer 38. The diaphragm retainer plate 44 also has a projection portion 50 extending axially from the base portion 46. The diaphragm retainer plate 44 has a cavity 52 extending axially into the base portion 46 and the projection portion 50. The cavity 52 has a generally spherically shaped valve portion 54 to receive the projection 36 of the valve 34 and a generally cylindrical shaped spring portion 56 for a function to be described. The diaphragm retainer plate 44 is made of a rigid material such as metal. It should be appreciated that the diaphragm retainer plate 44 is conventional and known in the art.

The fuel pressure regulator 12 also includes a valve spring 58 disposed in the spring portion 56 of the cavity 52 of the diaphragm retainer plate 44. The valve spring 58 is of a coil spring type to urge the valve 34 toward the valve seat 10. It should be appreciated that the valve spring 58 is conventional and known in the art.

The fuel pressure regulator 12 includes a diaphragm 60 disposed about the projection portion 50 and adjacent the base portion 46 of the diaphragm retainer plate 44. The diaphragm 60 extends radially and is generally circular in shape to be received within the flange wall 20 of the base 14. The diaphragm 60 is made of relatively thin and flexible material such as nitrile. It should be appreciated that the diaphragm 60 is conventional and known in the art.

The fuel pressure regulator 12 includes a diaphragm protector plate 62 disposed about the projection portion 50 of the diaphragm retainer plate 44 and adjacent the diaphragm 60. The diaphragm protector plate 62 is generally circular in shape with a generally "U" shaped cross-section. The diaphragm protector plate 62 is made of a rigid material such as metal. It should be appreciated that the diaphragm protector plate 62 is conventional and known in the art.

The fuel pressure regulator 12 also includes a pressure plate 64 disposed adjacent the diaphragm 60. The pressure plate 64 is made of a rigid material such as metal. It should be appreciated that the pressure plate 64 is conventional and known in the art.

The fuel pressure regulator 12 includes a spring seat 66 disposed within the pressure plate 64. The spring seat 66 is generally circular in shape. The spring seat 66 includes a base portion 68 extending radially and a side portion 70 extending axially and generally perpendicular to the base portion 68 and an end portion 72 extending radially to form a cavity 74 for a function to be described. The spring seat 66 is made of a rigid material such as metal. It should be appreciated that the spring seat 66 is conventional and known in the art.

The fuel pressure regulator 12 also includes a regulator spring 76 disposed in the cavity 74 of the spring seat 66. The regulator spring 76 is of a coil spring type to urge the diaphragm protector plate 62 toward the diaphragm 60. It should be appreciated that the regulator spring 76 is conventional and known in the art.

The fuel pressure regulator 12 includes a cover 78 disposed about the internal components. The cover 78 is generally circular in shape. The cover 78 has a base wall 80 extending radially and a side wall 82 extending axially from the base wall 80. The cover 78 also includes a flange wall 84 extending radially from the side wall 82 and having a generally "C" cross-sectional shape and overlapping the flange wall 20 of the base 14. The cover 78 has an aperture 86 extending axially through the base wall 80 that is generally circular in shape. The cover 78 has a projection wall 88 around the aperture 86 and extending axially for a function to be described. The cover 78 also has a connector wall 90 extending radially and axially at an angle from the base wall 80 and side wall 82 with a passageway 92 extending therethrough. The connector wall 90 is for attachment to a conduit (not shown), which in turn, is connected to an engine (not shown) of the vehicle (not shown). The cover 78 is made of a rigid material such as metal. It should be appreciated that the cover 78 is a monolithic structure being integral, unitary, and one-piece. It should also be appreciated that the cover 78 is conventional and known in the art.

The fuel pressure regulator 12 further includes an adjustment screw 94 disposed in the aperture 86 of the cover 78 and is threaded to cooperate with the projection wall 88 for adjusting the pressure or force of the regulator spring 76. The adjustment screw 94 is made of a rigid material such as metal. It should be appreciated that the adjustment screw 94 is conventional and known in the art.

Referring to FIGS. 1 through 3, the valve seat 10, according to the present invention, is disposed in the cavity 23 of the base 14. The valve seat 10 includes a valve body 95. The valve body 95 is generally cylindrical in shape with a generally circular cross-sectional shape. The valve body 95 has a base portion 96 extending radially and circumferentially and a side portion 98 extending axially and circumferentially from the base portion 96. The valve seat 10 has an aperture 100 extending axially through the valve body 95. The aperture 100 has a base diameter 102 greater than a side diameter 104. The aperture 100 is tapered through the axial length of the valve body 95 a predetermined angle such as seven degrees from a longitudinal axis of the valve seat 10. The valve seat 10 also has a chamfer 106 on a leading edge of the valve body 95. The chamfer 106 extends axially and radially outward from the base diameter 102 a predetermined angle such as forty-five degrees from the longitudinal axis of the valve seat 10. The chamfer 106 smoothes the transition of the fluid flow as the fluid is bypassed by the fuel pressure regulator 12. The valve seat 10 also has a chamfer 108 on a trailing edge of the valve body 95. The chamfer 108 extends axially and radially outward from the side diameter 104 a predetermined angle such as forty-five degrees from the longitudinal axis of the valve seat 10. The valve seat 10 is made of a rigid material such as metal. It should be appreciated that the taper creates a constantly reducing seat inner diameter. It should also be appreciated that the reducing diameter effectively reduces fluid flow cavitation by limiting the expansion of the fuel.

In operation, the fuel pressure regulator 12 is illustrated in an assembled state in which the valve seat 10 is disposed in the cavity 23 of the base 14. The valve 34 engages the valve seat 10 in the closed position as illustrated in FIG. 1. The valve 34 is contained on the valve seat 10 by the regulator spring 76.

Fuel enters the base 14 of the fuel pressure regulator 12 and flows through apertures (not shown) in the base wall 16 of the base 14 to a cavity 111 in the fuel pressure regulator 12. In the fuel pressure regulator 12, fuel flow into the cavity 111 causes the valve 34 to move away from the base portion 96 of the valve seat 10, allowing fuel to flow through the aperture 100 and out through the passageway 25 of the base 14 and out to the engine.

In the open position as illustrated in FIG. 2, fuel in through the fuel pressure regulator 12, as indicated by the arrows, flows past the chamfer 106 and through the aperture 100 and past the chamfer 108 and out through the passageway 25 of the base 14. It should be appreciated that, in the open or retained position, geometry of the valve seat 10 reduces flow cavitation by limiting expansion of the fuel.

Figure 4:
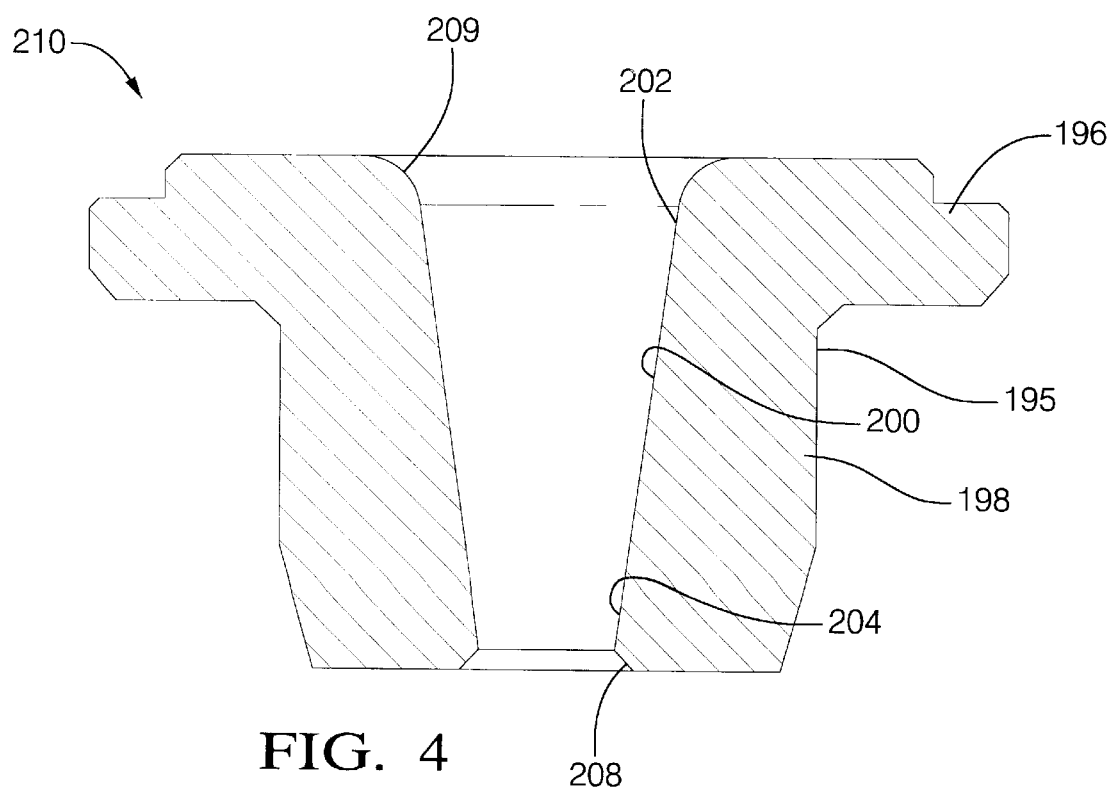
FIG. 4 is a view similar to FIG. 3 of another embodiment, according to the present invention, of the valve seat of FIG. 1.

Referring to FIG. 4, another embodiment, according to the present invention, of the valve seat 10 is shown. Like parts of the valve seat 10 have like reference numerals increased by one hundred (100). In this embodiment, the valve seat 110 has the valve body 195 with the base portion 196, side portion 198, aperture 200, base diameter 202, side diameter 204, and chamfer 208 at the trailing edge. The valve seat 110 eliminates the chamfer on the leading edge and has a radius 209 on the leading edge of the valve body 195. The radius 209 is curved axially and radially outward from the base diameter 202 a predetermined amount such as 0.70 inches from a radii thereof. The radius 209 smoothes the transition of the fluid flow as the fluid is bypassed by the fuel pressure regulator 12. The operation of the valve seat 110 is similar to the valve seat 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A valve seat for a fuel pressure regulator comprising:
   a valve seat body adapted to be disposed in the fuel pressure regulator;
   an aperture extending axially through said valve seat body, said aperture being tapered through said valve seat body and having a cross-sectional area decreased from an inlet to an outlet to reduce fluid flow cavitation by limiting expansion of the fuel.

2. A valve seat as set forth in claim 1 wherein said taper has a predetermined angle from a longitudinal axis of said valve seat body.

3. A valve seat as set forth in claim 2 wherein said predetermined angle is seven degrees.

4. A valve seat as set forth in claim 3 wherein said valve seat body has a base portion extending radially and a side portion extending axially from said base portion.

5. A valve seat as set forth in claim 4 wherein said aperture has a base diameter in said base portion and a side diameter in said side portion, said base diameter being greater than said side diameter.

6. A valve seat as set forth in claim 1 wherein said valve seat body has a leading edge and a trailing edge spaced axially from said leading edge, said aperture extending from said leading edge to said trailing edge.

7. A valve seat as set forth in claim 6 wherein said trailing edge has a chamfer at a predetermined angle.

8. A valve seat as set forth in claim 7 wherein said predetermined angle is forty-five degrees.

9. A valve seat as set forth in claim 6 wherein said leading edge has a chamfer at a predetermined angle to smooth fluid flow transition as fluid is bypassed by the fuel pressure regulator.

10. A valve seat as set forth in claim 6 wherein said leading edge has a radius at a predetermined radii to smooth fluid flow transition as fluid is bypassed by the fuel pressure regulator.

11. A valve seat as set forth in claim 1 wherein said valve seat is a monolithic structure being integral, unitary, and one-piece.

12. A fuel pressure regulator comprising:
    a housing having a cavity therein;
    a valve seat disposed in said cavity;
       said valve seat having an aperture extending axially therethrough, said aperture being tapered and having a cross-sectional area decreased from an inlet to an outlet to reduce fluid flow cavitation by limiting expansion of fuel.

13. A fuel pressure regulator as set forth in claim 12 wherein said taper has a predetermined angle from a longitudinal axis of said valve seat.

14. A fuel pressure regulator as set forth in claim 13 wherein said predetermined angle is seven degrees.

15. A fuel pressure regulator as set forth in claim 12 wherein valve seat has a base portion extending radially and a side portion extending axially from said base portion.

16. A fuel pressure regulator as set forth in claim 12 wherein said aperture has a base diameter at a leading edge thereof and a side diameter in a trailing edge thereof, said base diameter being greater than said side diameter.

17. A fuel pressure regulator as set forth in claim 12 wherein said valve seat has a leading edge and a trailing edge spaced axially from said leading edge, said aperture extending from said leading edge to said trailing edge.

18. A fuel pressure regulator as set forth in claim 17 wherein said leading edge has a chamfer at a predetermined angle to smooth fluid flow transition as fluid is bypassed by said fuel pressure regulator.

19. A fuel pressure regulator as set forth in claim 17 wherein said leading edge has a radius at a predetermined radii to smooth fluid flow transition as fluid is bypassed by said fuel pressure regulator.

20. A fuel tank assembly for a vehicle comprising:
    a fuel tank;
    a fuel pressure regulator disposed within said fuel tank;
       said fuel pressure regulator comprising a housing having a cavity therein and a valve seat disposed in said cavity and having a passageway extending axially therethrough, said passageway being tapered and having a cross-sectional area decreased from an inlet to an outlet to reduce fluid flow cavitation by limiting expansion of fuel.

* * * * *